US006802679B2

(12) United States Patent
Heinloth

(10) Patent No.: US 6,802,679 B2
(45) Date of Patent: Oct. 12, 2004

(54) DRILLING TOOL

(75) Inventor: Markus Heinloth, Postbauer-Heng (DE)

(73) Assignee: Widia GmbH, Essen (DE)

(\*) Notice: Subject to any disclaimer, the term of this patent is extended or adjusted under 35 U.S.C. 154(b) by 228 days.

(21) Appl. No.: 10/239,985

(22) PCT Filed: Feb. 24, 2001

(86) PCT No.: PCT/DE01/00765

§ 371 (c)(1),
(2), (4) Date: Oct. 4, 2002

(87) PCT Pub. No.: WO01/74520

PCT Pub. Date: Oct. 11, 2001

(65) Prior Publication Data

US 2004/0096284 A1 May 20, 2004

(30) Foreign Application Priority Data

Apr. 4, 2000 (DE) .......................................... 100 16 684

(51) Int. Cl.$^7$ ............................................... B23B 51/00
(52) U.S. Cl. ...................... 408/156; 408/179; 408/181; 408/714
(58) Field of Search ................................ 408/153, 154, 408/156, 179, 181, 714

(56) References Cited

U.S. PATENT DOCUMENTS

| 4,218,068 A | \* | 8/1980 | Lutz et al. ................... 408/146 |
| 4,351,207 A | \* | 9/1982 | Werth, Jr. ..................... 82/158 |
| 5,286,042 A | | 2/1994 | Laube |
| 5,533,847 A | \* | 7/1996 | Basteck ....................... 409/234 |
| 5,704,742 A | \* | 1/1998 | Reinauer ..................... 408/156 |
| 5,947,658 A | | 9/1999 | Eysel |
| 6,247,878 B1 | \* | 6/2001 | Musil et al. ................. 408/1 R |
| 6,557,445 B1 | \* | 5/2003 | Ishikawa ..................... 82/158 |

FOREIGN PATENT DOCUMENTS

| DE | 27 51 255 | | 5/1978 | |
| DE | 27 30 418 | | 1/1979 | |
| DE | 32 34 238 | | 3/1984 | |
| DE | 35 00 602 | | 7/1985 | |
| DE | G 92 03 801 | | 7/1992 | |
| DE | 44 16 040 | | 11/1995 | |
| EP | 0 088 505 | | 9/1983 | |
| EP | 0 181 844 | | 5/1990 | |
| FR | 2 125 227 | | 9/1972 | |
| FR | 2643002 | \* | 8/1990 | ................. 408/156 |
| WO | WO 98/07539 | | 2/1998 | |

\* cited by examiner

*Primary Examiner*—Daniel W. Howell
*Assistant Examiner*—Michael W. Talbot
(74) *Attorney, Agent, or Firm*—Herbert Dubno; Andrew Wilford

(57) ABSTRACT

The invention relates to a drilling tool comprising a tool holder, on whose front face interchangeable cutting attachments are fixed and which has a shaft part on the opposite end to said attachments and an adjusting device for minimizing the tolerance measurement determined by the drilling system. In order to improve the aforementioned adjusting device, the invention is characterized in that the tool holder (1) has groove-shaped recesses (5, 8), which lie on respective diametrically opposed sides and which are eccentrically arranged on a plane that is perpendicular to the longitudinal axis of the tool holder. Said groove-shaped recesses have a half-cylinder extension on each of the sides facing the longitudinal axis of the tool holder. A bolt (2, 3), whose dimensions correspond to the size of the cylinder, is located in each extension. The first bolt (2) is connected to a tapered adjusting element (9) using a double-threaded screw (11) which is positioned radially in relation to the tool holder (1). Said tapered adjusting element lies within a cone-shaped cavity running from the outside of the tool holder (1), in such a way that the distance to the first bolt (2) can be adjusted by rotating the double-threaded screw (11), whereby the distance that has been set determines the degree to which the groove-shaped recess (8) located on this side is further expanded or slackened, and in such a way that the second bolt (3) can be tightened in relation to the tool holder (1), using a threaded bolt (4) that engages with a continuous threaded bore of said second bolt. The latter thus counteracts the corresponding strain on the tool holder (1) in the vicinity of the groove-shaped recess (5) which lies on this side.

8 Claims, 3 Drawing Sheets

DRILLING TOOL

Figure 1:
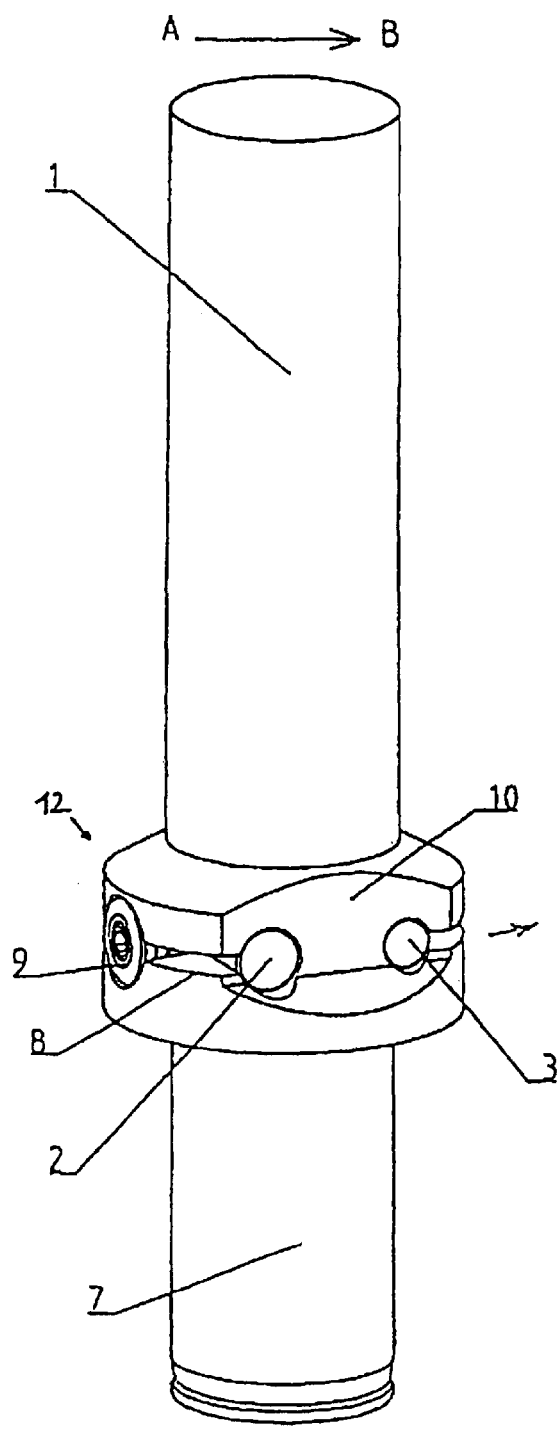

The invention relates to a drilling tool with a tool holder having an outer end on which a cutting insert can be mounted and an opposite inner end with a shank, and with an adjustment device for minimizing drilling-system misalignment.

Such tools equipped with cutting inserts without any possibility of adjustment are described in WO 98/07539, EP 0,088,505, EP 0,181,844, DE 27 30 418, EP 0,054,913, DE 27 51 255, or DE 44 16 040.

Standard indexable cutting plates, tool holders with plate seats for the indexable cutting plates, and even boring bars can only be manufactured within a certain tolerance range. Deviations from the ideal are additive, which leads to diameter tolerances in a drilling tool of ±0.15 mm. A single-cutter drilling tool changes effective hole diameter during the service life as a result of wearing of the cutting inserts. Due to wear, the radial forces are increased which limit mainly the service life of the drilling tool or that of the cutting inserts being used by over-shooting or undershooting the desired diameter tolerance. In practice it is only occasionally possible to set the entire structure of the drilling tool with the holder, the indexable cutting plate, and the spindle for the proper tolerance range right from the start in order to hold the maximum diameter tolerance to 0.3 mm over the life of the cutting inserts. In addition it is often necessary to work to a much smaller tolerance of ±0.1 mm.

This problem is solved by the use of a radially displaceable bit holder that is constituted by an additional tool adaptor, but this is disadvantageously very expensive.

There exists at present on the market a tool holder with an adjustment device in that the tool holder has a radially directed tapered bore in which a radially movable cone is screwed by means of which the tool holder can be deformed to a relatively small extent, allowing the correction of minor tolerance variations. The finished bore diameter can however be greater after adjustment than the desired diameter. The disadvantage of this system is that the forces brought to bear by the cone are only effective in a very small area. This leads in practice to the development at high cutting speeds of vibrations in the holder. In addition the employed cone produces an off-center distribution of mass that causes a significant eccentricity which at high cutting speeds of 500 m/min or more can have a significant effect.

German 3,500,602 describes a drilling tool of the above-described type wherein the central axis of the holder shaft can be angularly offset from the central axis of the shank by elastic deformation of the drilling tool in the plane of the cutting edges and this angular position can be fixed. This is made possible by two diametrically oppositely open slots that are formed in a common plane which extends at 90° to the plane extending through the cutting edges of the cutting faces, perpendicular to the central axis of the drilling tool. The region of these slots is provided with an adjusting device engageable with the faces of the slots or braced on the opposite sides. With this system however there is only a point-contact adjustment and retention, risking making the workpiece too flexible especially at high cutting speeds.

It is therefore an object of the invention to improve on the above-described adjusting device to minimize tolerance deviations caused by the drilling system.

This object is achieved by the drilling tool according to claim 1.

The solution of the invention is that the slots each have an inner side formed with a cylindrical seat receiving a respective bolt of complementary size, one of the bolts being connected via a double-threaded screw extending radially of the holder with a spreading cone that is seated in a conically shaped outer recess of the tool holder. Rotation of the double-threaded screw changes the spacing to the one bolt, the spacing to the one bolt determining which side of the slot is spread or destressed. The other bolt bears via a threaded screw passing completely through a threaded hole of this bolt against the tool holder so that it effects a corresponding bracing of the tool holder in the region of the slot on this side. This above-described solution has several advantages over the prior art. First, the diametrically opposite slots form two defined regions at which the tool holder can be spread on one side and compressed on another. In addition in the compression region of the groove by the other braceable bolt a counterforce is made effective against the force of the adjustment cone and as a result tool vibrations are reduced. In addition the adjustment cone which is threaded on the double-threaded screw has a very fine pitch and thus one can very finely adjust the spreading of the slot on this side. Unlike the versions of the prior art in which the threaded cone is screwed into a preformed bore of the tool holder which is extremely prone to war as a function of how much it is spread, with this invention the spreading force is created by contact of the adjustment-cone surface and the complementary conical surface of the recess of the tool holder. The use of two bolts allows the tool holder to have maximum rigidity. In addition with the adjustment device of this invention which is formed of the two bolts, the double-threaded screw, the cone screw, and the threaded screw, there is much better weight distribution, that is the remaining mass eccentricity is minimal relative to the embodiments of the prior art. Finally the adjustment device according to the invention produces a substantially greater final tolerance in the tool system which is limited to ±0.1 mm, preferably ±0.05 mm.

Further features of the invention are seen in the dependent claims.

Thus the bolts extend parallel to each other, that is the bolts are mirror-symmetrical to an axis extending perpendicularly through the center of the tool holder. This formation makes it possible to put the conical recesses on one or the other side and the counter bolt on the opposite side. If necessary the two bolts can have the same dimension (diameter and length). The invention proposes embodiments where both opposite sides have an adjustment cone, a double-threaded screw, and a bolt as the respective adjustment devices. In this cases applying adjusting forces and counter forces can be done in the same way on both sides.

According to a further embodiment of the invention, the bolts engage flatly at least longitudinally in line contact with the respective cylindrical seats. This advantageously avoids wedging or locking of the bolts.

According to a further embodiment the tool holder has a thickened region from which the shank extends and which carries the adjustment device. In this manner one obtains the largest possible displacement angle of the tool-holder edges with cutting inserts there.

In order to ease the spreading or compression of the tool holder at the slots, the tool thickened region has, offset by 90° to the slots (between the slots) on opposite sides and level with the slots, cutouts reducing the thickness of and weakening the thickened region or in other words the tool thickened region is reinforced on the sides with the slots.

Preferably the slot width is between 0.1 mm and 4 mm.

A diameter of the seats and of the respective bolts is greater than a width of the slots, a diameter of the one bolt and its seat being at least 20% larger than a diameter of the other (counter) bolt and its seat.

Finally according to a further embodiment of the invention a spacing between the seats holding the bolts is at least as great as the width of the tool holder at its insert-carrying end.

Figure 2:
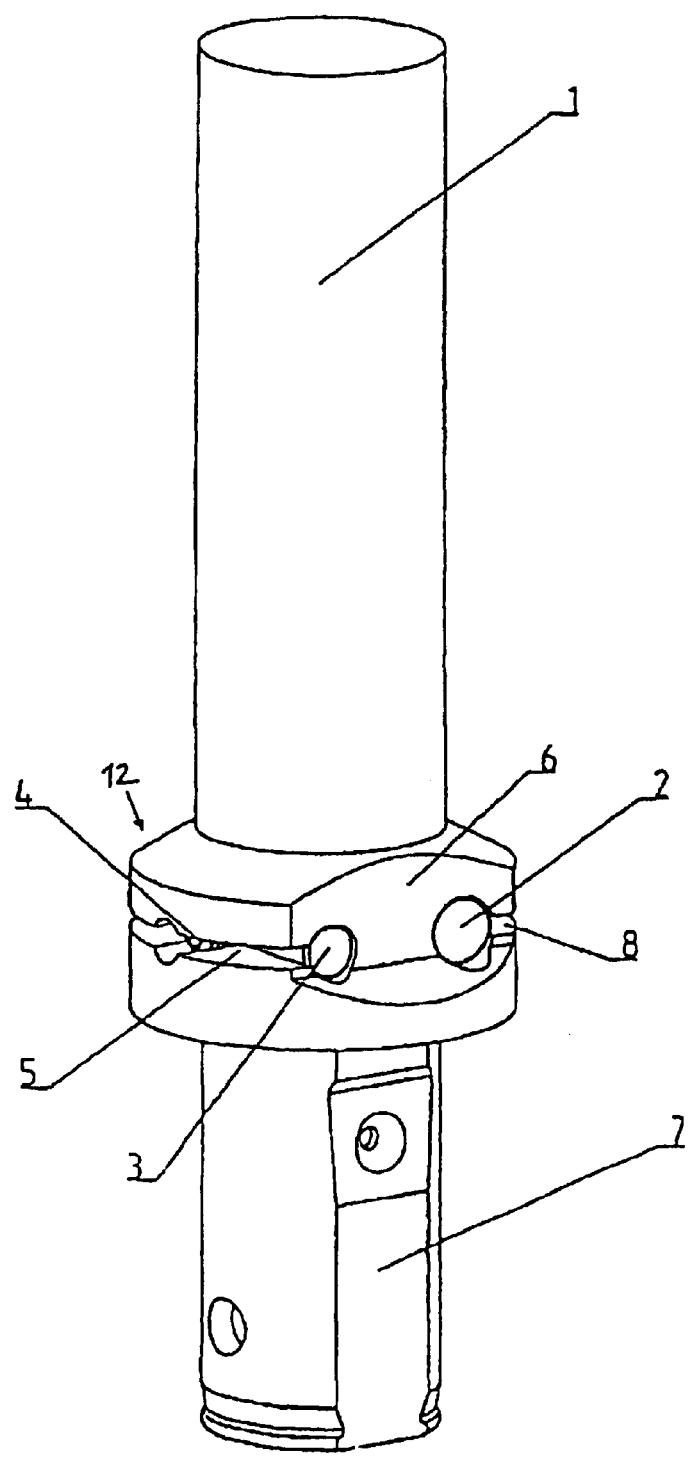
Figure 3:
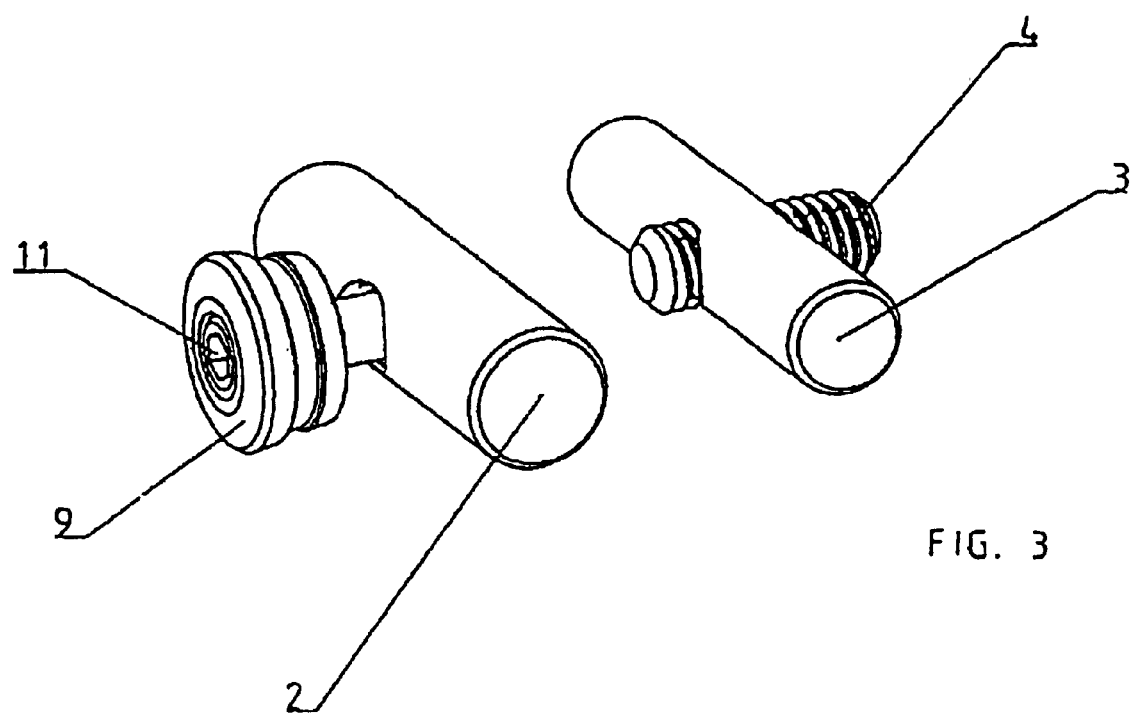

An embodiment of the invention is shown in the drawing. Therein:

FIGS. 1 and 2 are perspective views of a tool holder with integrated adjustment device in different respective view angles; and FIG. 3 shows (without the tool carrier) the adjustment and counter elements according to FIG. 1.

As already described drilling tools are known from the prior art with a tool holder having at one end a shank for chucking the tool holder and at the opposite end replaceable cutting inserts, reference being made in particular to WO 98/08539.

FIGS. 1 and 2 schematically show a tool holder 1 (without the end part with seats in which the cutting inserts are clamped). This tool holder has a shank 7 as well as immediately adjacent thereto an axially extending thickened holder region 12 in which is mounted the adjustment device to minimize misalignments caused by the drilling system. This adjustment device is comprised of two bolts 2 and 3 that are held in respective cylindrical seats formed at the inner ends of slots 5 and 8. The large-diameter bolt 2 has a transverse threaded bore in which one end of a double-threaded screw 11 is threaded. The other end of the double-threaded screw 11 is screwed into a complementary internal screwthread in an adjustment cone 6 whose outer surface has a conical region that sits flatly in a conical seat of the same apex angle of the tool holder 1.

The bolt 3 is mounted on the opposite side and also has a transverse threaded bore in which a threaded screw 4 is threaded.

The tool-holder thickened region has in the opposite sides shown in FIGS. 1 and 2 lateral cutouts 6 and 10.

The adjustment device is used in the following manner:

The tool starts out set to a predetermined diameter with a completely destressed adjustment unit 2, 3, 4, 9, 11. The threaded screw 4 and the double-threaded screw 11 are loose. In order to move from A to B as shown in FIG. 1, the double-threaded screw 11 is screwed radially toward the tool-holder center. This moves the adjustment cone 9 radially inward, that is the spacing of the adjustment cone 9 from the bolt 2, whose position 2 is fixed in the tool holder, is decreased. As a result of the spreading of the slot 8 by the conical surfaces and simultaneous closing of the opposite slot, the tool holder bends, that is the end of the tool holder moves from A to B. The bolt 2 is simultaneously pressed onto the respective seat at the end of the groove 8 so that there is at least line contact and even surface contact along its length so as to additionally tension and stabilize the tool holder 1.

In order to make the tool holder 1 even stiffer, once the desired diameter is set by the double-threaded screw, the threaded screw 4 is turned to press the bolt 3 radially outward into at least line contact with the tool holder or the respective cylindrical seat. This is done by forcing the radial inner end of the threaded screw 4 against a surface of the tool holder. The bolt 3, which exerts a radially outwardly directed force perpendicular to its longitudinal axis, forms a support in the slot 5, thereby preventing the tool holder (by closing the groove 5) from vibrating. The bolt 2, the double-threaded screw 11, the adjustment cone 9 and the spreading of the slot 8 caused by them on one side and the counter force from the loaded bolt 3 creates maximum stiffness in the tool holder.

As a result of nearly fully filling of all spaces of the relatively movable parts in the tool holder 1, the eccentricity of its mass is greatly reduced, in this case to a minimum. In addition the adjustment cone 9 effects an optimal adjustment or bending of the tool holder, so as to affect its tolerances. The adjustment device can be made inexpensively, since parts like the bolts 2 and 3, the double-threaded screw 11, the threaded screw 4, and the adjustment cone 9 are standard items. There is also the possibility of making the tool holder adjustable in both directions, that is use the adjustment cone with the double-threaded screw in the slot 5 instead of in the slot 4 and similarly to put the threaded screw on the opposite side.

As a result of the precise adjustment device and the counter force on the opposite side for reducing vibration, the tool will work with less friction and thus the service lives of the cutting inserts employed will be increased. In general the described drilling tool can be made inexpensively, but also is simple and easy to use.

What is claimed is:

1. A drilling tool comprising:
   a tool body formed integrally with
      an elongated shank adapted to fit in a chuck,
      an elongated tool-holding shaft adapted to hold a cutting insert and generally coaxial with the shank, and
      a central region between the shank and shaft and itself formed on a plane generally perpendicular to the axes with a pair of diametrally oppositely open slots, each slot having a base formed as a substantially cylindrical bolt seat, one of the slots being formed outward of the respective bolt seat with a radially outwardly flaring frustoconical seat;
   respective substantially cylindrical bolts snugly received in the seats and each formed with a transverse threaded hole;
   a spreading cone fitted to the frustoconical seat, whereby radial inward displacement of the cone spreads the one slot and deforms the tool;
   a double-threaded screw having an inner part threaded into the bore of the bolt of the one slot and an outer part threaded into the cone, whereby rotation of the double-threaded screw radially displaces the cone; and
   a bracing screw threaded into the bore of the bolt of the other slot and radially engageable with the body.

2. The drilling tool defined in claim 1 wherein the bolts and seats extend parallel to each other.

3. The drilling tool defined in claim 1 wherein the bolts are in line contact with the respective bolt seats.

4. The drilling tool defined in claim 1 wherein the body is of greater diameter at the central region than at the shaft and shank.

5. The drilling tool defined in claim 4 wherein the thickened region is formed with a pair of diametrally opposite cutouts offset 90° from the slots.

6. The drilling tool defined in claim 4 where in the seats are spaced apart by a distance at least equal to a diameter of the tool-carrying shaft.

7. The drilling tool defined in claim 1 wherein the slots have an axial width of between 0.1 mm and 4 mm.

8. The drilling tool defined in claim 1 wherein the seat and bolt of the one slot are of a diameter at least 20% greater than a diameter of the seat and bolt of the other slot.

* * * * *